Figures 1, 2:
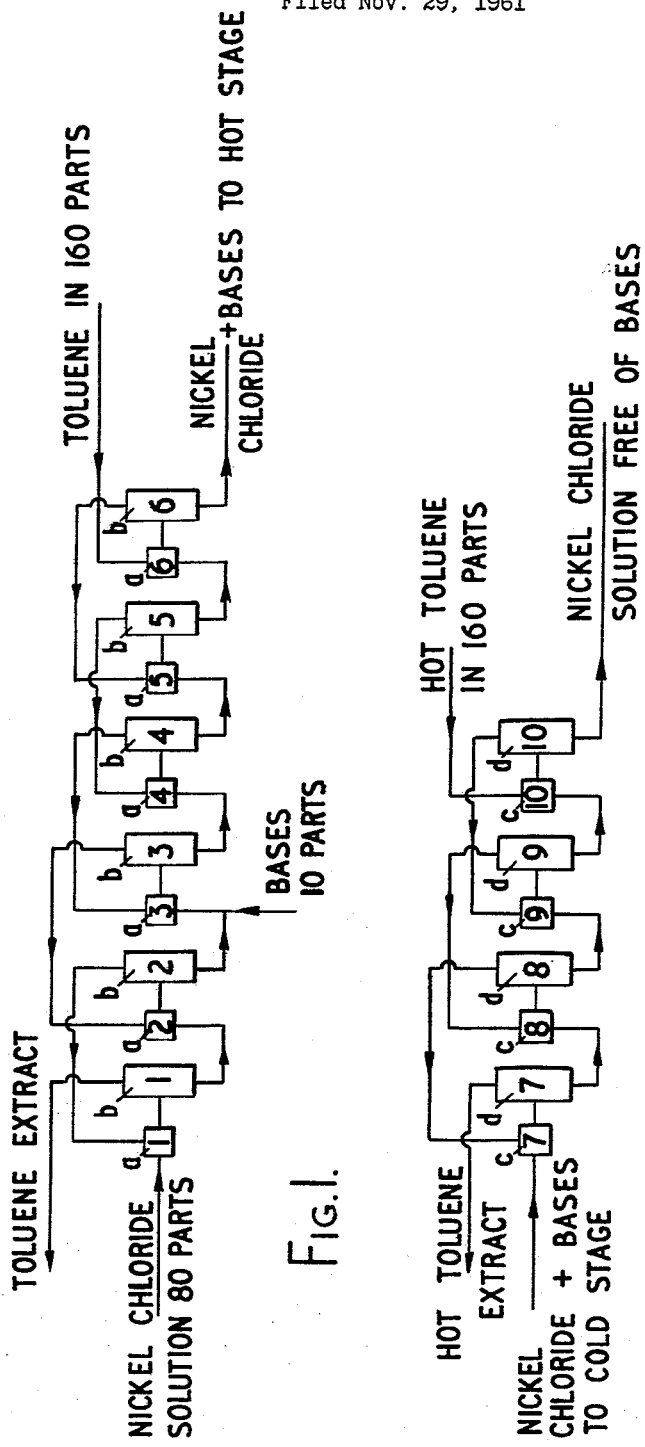

3,135,757
PROCESS FOR THE SEPARATION OF PYRIDINE HOMOLOGUES
Wright Waddington, Gomersal, near Leeds, England, assignor to The Coal Tar Research Association, Gomersal, England
Filed Nov. 29, 1961, Ser. No. 155,619
9 Claims. (Cl. 260—283)

This invention relates to the separation of pyridine homologues having the α-position substituted, such as 2-methyl pyridine (α-picoline), 2-ethyl pyridine, 2:6-dimethyl pyridine and other disubstituted or trisubstituted pyridines in which one of the substituent groups occupies the α- or 2-position of the pyridine nucleus, from pyridine and those homologues having no substitution in the 2-position, such as 3-methyl pyridine (β-picoline), 4-methyl picoline (γ picoline), 3-4-dimethyl pyridine and 3-5-dimethyl pyridine. In this context quinoline may be regarded as pyridine substituted in the 2-3-position and isoquinoline as pyridine substituted in the 3-4-position. Especially are those pyridine bases found in coal tar distillates.

The invention consists in a process of resolving a mixture of pyridine homologues (which expression is hereinafter to be understood broadly as including pyridine, quinoline and isoquinoline, into a first component substituted in the 2-position and a second component having the 2-position free, which comprises treating the mixture with a mineral acid salt of nickel, cobalt or iron to form a complex with the second component, separating the complex from the first component, and decomposing it to regenerate the salt and the pyridine homologue or homologues of the second component.

Generally, it is preferred to use cobalt or nickel salts, as the complexes with the iron salts have a greater tendency to precipitate. Whilst this does not render the process inoperative, it will usually require special equipment able to deal with suspended precipitate.

The separation of the complex from the first component may be conveniently effected by partitioning between water and a hydrophobic solvent for pyridine homologues, such as toluene. The decomposition of the complex may generally be effected by heating an aqueous solution of the complex to about 80–100° C.; alternatively, the complex may be heated as an aqueous suspension at a concentration exceeding its water solubility. As the initial treatment may be effected with an aqueous solution of the mineral acid salt, it is generally convenient to extract a mixture of the homologues to be resolved and an aqueous solution of the salt with a suitable solvent, and then heat the aqueous residue. The heated aqueous residue may be extracted by the hydrophobic solvent such as toluene or may be distilled, when it will be found that the base is concentrated in the condensed aqueous distillate. This method is suitable for those homologues of pyridine which form a complex with the mineral acid salt, and which complex is decomposed by heating to 80–100° C. Certain complexes, especially those formed by isoquinoline and the mineral acid salt of nickel, cobalt or iron, are not so decomposed at the low temperature of 80–100° C. but may be extracted by toluene under pressure such that the temperature of the aqueous phase reaches 130–170° C. Alternatively, chemical means for extracting the complexes may be employed, these involving addition of sodium hydroxide to break-down the mineral acid salt complex, the base being obtained by extraction with toluene or by steam distillation, the mineral acid salt being regenerated by addition of the corresponding acid to dissolve the metal hydroxide.

Thus, if a solution of nickel chloride and a mixture of α, β and γ picolines is extracted at room temperature with toluene, only the α-picoline is extracted. On warming the aqueous residue to 95° C., it will yield, on further extraction with hot toluene, the β and γ picolines. Instead of the chloride, the sulphate or nitrate may be used. The process is particularly valuable as applied to a mixture of 2:6-lutidine and β and γ picolines, which is difficult to resolve by fractional distillation, even in the presence of water.

It is preferred to form the complex by means of an aqueous solution of the mineral acid salt which is substantially free from acid. A suitable solution can readily be obtained by adding a little aqueous ammonia to a boiling aqueous solution of the salt, until a slight precipitate is obtained; this latter may be filtered off.

The invention will be described further by means of the following specific examples and the accompanying flowsheets, of which:

FIGURE 1 shows the cold extraction of a bases feedstock, and
FIGURE 2 shows the hot extraction of a heated extract from FIGURE 1.

*Example 1*

By means of a standard, multiple contact counter-current system comprising mixer stages alternating with separator stages, a feedstock consisting of:

|  | Percent |
|---|---|
| α picoline | 2.16 |
| 2:6-lutidine | 41.70 |
| 2-ethyl pyridine | 2.02 |
| β-picoline | 26.04 |
| γ-picoline | 27.55 | was extracted with toluene and 20% aqueous nickel chloride solution at 20° C. Six mixer stages $a$ and separator stages $b$ were used, as shown in FIGURE 1, and the feedstock was supplied to the third stage. Ten parts by volume of feedstock were fed for each 80 parts by volume of the aqueous nickel chloride fed to mixer stage 1 and each 160 parts of toluene fed to mixer stage 6. The toluene extract removed from separator stage 1 was treated with 35% sulphuric acid to remove the extracted bases, and with dilute caustic soda before being returned to the system. The bases in the sulphuric acid extract were liberated by adding solid caustic soda and found to contain:

|  | Percent |
|---|---|
| 2:6-lutidine | 89.6 |
| α-picoline | 4.65 |
| 2-ethyl pyridine | 4.45 |
| β and γ picolines | 1.32 |

This mixture represented 46% v./v. of the feedstock.

The nickel chloride extract from separator stage 6 was heated to 95° C. and extracted continuously and countercurently with 160 parts of hot toluene through four stages as shown in FIGURE 2. These consist of mixer stages $c$, and separator stages $d$, numbered 7–10. The aqueous nickel chloride from separator stage 10 was cooled and recycled to mixer stage 1 of FIGURE 1; the toluene extract from separator stage 7 was treated as described with reference to FIGURE 1 and returned to mixer stage 10. The acid extract was treated with solid caustic soda to liberate a bases mixture containing:

|  | Percent |
|---|---|
| β picoline | 48.5 |
| γ picoline | 51.5 | representing 54% v./v. of the feedstock.

Although the process of this invention is applicable to a mixture of pyridine homologues including pyridine itself, it may be found more convenient first to separate pyridine from the other homologues to be treated, by distillation.

*Example 2*

A mixture of 50 parts quinoline and 50 parts isoquinoline were dissolved in toluene to yield a 5% solution. The solution was extracted three times with 50% v./v. of 20% w./w. nickel chloride solution at room temperature. The toluene layer after these extractions was found to contain bases with a quinoline content of 95% purity. The combined nickel chloride extracts were treated with sodium hydroxide solution to precipitate nickel hydroxide, and the precipitate and aqueous liquor were extracted with toluene to obtain a bases fraction containing 82% isoquinoline and 18% quinoline.

What we claim is:

1. A process of extracting a pyridine homologue having the 2-positions free, from a mixture thereof with a pyridine homologue substituted in the 2-position, which comprises extracting said mixture in the presence of a water immiscible solvent, with an aqueous solution of a mineral acid salt selected from the group consisting of chlorides, nitrates and sulfates of nickel, cobalt and iron.

2. A process according to claim 1 in which the extraction is conducted at about 20° C.

3. A process of extracting 3-methyl pyridine together with 4-methyl pyridine from a mixture thereof with 2:6-dimethyl pyridine, which comprises extracting said mixture in the presence of a hydrophobic solvent, with an aqueous solution of a mineral acid salt selected from the group consisting of chlorides, nitrates and sulfates of nickel, cobalt and iron.

4. A process according to claim 3 in which the hydrophobic solvent is toluene and the extraction is conducted at about 20° C.

5. A process according to claim 4 in which said mixture is extracted with toluene and with 20% aqueous nickel chloride in successive stages.

6. A process according to claim 5 in which said aqueous nickel chloride solution is adjusted substantially to neutrality.

7. A process according to claim 1 in which the resulting aqueous extract is heated to regenerate the mineral acid salt and the liberated pyridine homologue is removed whilst the regenerated aqueous metal salt solution is still hot.

8. A process of extracting isoquinoline from a mixture thereof with quinoline which comprises extracting said mixture with an aqueous solution of a mineral acid salt selected from the group consisting of chlorides, nitrates and sulfates of nickel, cobalt and iron in the presence of a hydrophobic solvent.

9. A process of extracting isoquinoline from a mixture thereof with quinoline which comprises diluting said mixture with toluene and extracting the diluted solution with an aqueous solution of nickel chloride containing about 20% by weight of nickel chloride at substantially room temperature.

References Cited in the file of this patent

UNITED STATES PATENTS

| | | |
|---|---|---|
| 2,391,270 | Reimers | Dec. 18, 1945 |
| 2,456,773 | Engel | Dec. 21, 1948 |

OTHER REFERENCES

Chumakov: Chem. Abs., vol. 51, col. 14829e (1957), abstract of USSR Patent 105,811, June 25, 1957.

Chumakov: Chem. Abs., vol. 53, col. 14127e (1959), abstract of USSR Patent 115,571. (Nov. 29, 1958.)

Chumakov: Chem. Abs., vol. 53, col. 21933 (1959).